US008863176B2

(12) United States Patent
Kulasekaran et al.

(10) Patent No.: US 8,863,176 B2
(45) Date of Patent: Oct. 14, 2014

(54) APPARATUS AND METHOD FOR CONTINUOUS VIDEO ADVERTISING

(75) Inventors: Ravi Kulasekaran, Saratoga, CA (US); Bala Chander, Saratoga, CA (US)

(73) Assignee: ADTV World, Cupertino, CA (US)

( * ) Notice: Subject to any disclaimer, the term of this patent is extended or adjusted under 35 U.S.C. 154(b) by 686 days.

(21) Appl. No.: 11/939,369

(22) Filed: Nov. 13, 2007

(65) Prior Publication Data

US 2009/0125936 A1   May 14, 2009

(51) Int. Cl.
| H04N 7/10 | (2006.01) |
| H04N 7/025 | (2006.01) |
| H04N 21/81 | (2011.01) |
| H04L 29/06 | (2006.01) |
| H04H 60/06 | (2008.01) |
| H04N 21/262 | (2011.01) |
| H04H 60/33 | (2008.01) |
| H04H 20/82 | (2008.01) |

(52) U.S. Cl.
CPC .............. *H04H 60/06* (2013.01); *H04N 21/812* (2013.01); *H04H 60/33* (2013.01); *H04H 20/82* (2013.01); *H04L 65/602* (2013.01); *H04N 21/26258* (2013.01)
USPC .................... 725/35; 725/32; 725/34; 725/36

(58) Field of Classification Search
USPC .......................... 725/32–36, 38–62; 705/14.1, 705/14.13–14.14
See application file for complete search history.

(56) References Cited

U.S. PATENT DOCUMENTS

| 6,253,189 B1* | 6/2001 | Feezell et al. ............... 705/14.61 |
| 2002/0059604 A1* | 5/2002 | Papagan et al. .................. 725/51 |
| 2003/0098869 A1* | 5/2003 | Arnold et al. .................. 345/589 |
| 2003/0139966 A1* | 7/2003 | Sirota et al. ...................... 705/14 |
| 2003/0149975 A1* | 8/2003 | Eldering et al. ................. 725/34 |
| 2004/0117827 A1* | 6/2004 | Karaoguz et al. ............... 725/42 |
| 2005/0267820 A1* | 12/2005 | Zheng ............................. 705/27 |
| 2006/0195866 A1* | 8/2006 | Thukral .......................... 725/34 |
| 2007/0204310 A1* | 8/2007 | Hua et al. ........................ 725/88 |
| 2008/0052169 A1* | 2/2008 | O'Shea et al. .................. 705/14 |
| 2008/0140524 A1* | 6/2008 | Anand et al. .................... 705/14 |

FOREIGN PATENT DOCUMENTS

| KR | 10-2000-0036938 A | 7/2000 |
| KR | 10-2000-0058499 A | 10/2000 |
| KR | 10-2001-0094845 A | 11/2001 |
| WO | WO 2006/127645 A2 | 11/2006 |

\* cited by examiner

*Primary Examiner* — Pankaj Kumar
*Assistant Examiner* — Alazar Tilahun
(74) *Attorney, Agent, or Firm* — Morgan, Lewis & Bockius LLP

(57) ABSTRACT

An advertising system is described. An advertising system includes a storage module to store video advertising content. The advertising system also includes a server coupled with the storage module. The server to deliver a continuous feed of video advertising content to an interactive device and to adapt the video advertising content responsive to input received from the interactive device.

15 Claims, 13 Drawing Sheets

APPARATUS AND METHOD FOR CONTINUOUS VIDEO ADVERTISING

FIELD

Embodiments of the invention relate to video advertising. In particular, embodiments of the invention relate to the continuous broadcast of video advertising.

BACKGROUND

Current advertising models intersperse advertisements between content such as news, sitcoms, text displays, and other programming. For this type of advertising model to be successful, the advertiser must anticipate a viewer's preferences based on surveys indicating the general preferences of the demographic that usually watches the type of content that the advertisement is interspersed around. The typical viewer under this model of advertising has an interest in the content the advertisement is associated with and not necessarily the advertisement. Therefore, the advertiser must expend a great deal of effort and cost to anticipate the viewer's interests and needs to ensure the viewer responds to the advertisement.

Another problem with current advertising models is the lack of interaction with a consumer at the time the advertising is viewed. Such lack of interaction makes gauging the interest level of a viewer of an advertisement difficult. Moreover, any interest in the products or services advertised to the viewer cannot be used to advertise other related products or services to the viewer. Furthermore, the viewer has no way of seeking out products or service areas that the viewer might be interested in learning more about.

SUMMARY

An advertising system is described. An advertising system includes a storage module to store video advertising content. The advertising system also includes a server coupled with the storage module. The server to deliver a continuous feed of video advertising content to an interactive device and to adapt the video advertising content responsive to input received from the interactive device.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of an advertising system are described that provide continuous advertising content to a viewer. In particular, an advertising system is described that includes a server to deliver a continuous feed of advertising content to an interactive viewer. Such an advertising system provides a more effective way of soliciting for business, since a user may interact with the advertising system to communicate interests. The knowledge of a user's interest provides an advertiser the ability to deliver more focused advertising. Moreover, embodiments of the advertising system provide the ability for a user to select advertising content based on topics, further increasing the effectiveness of targeting the interests of a particular user. Furthermore, the interactive nature of the advertising system provides the ability for a user to respond immediately to the advertising. This increases the likelihood that a user will seek out services or products that the advertising content is promoting.

Figure 1:
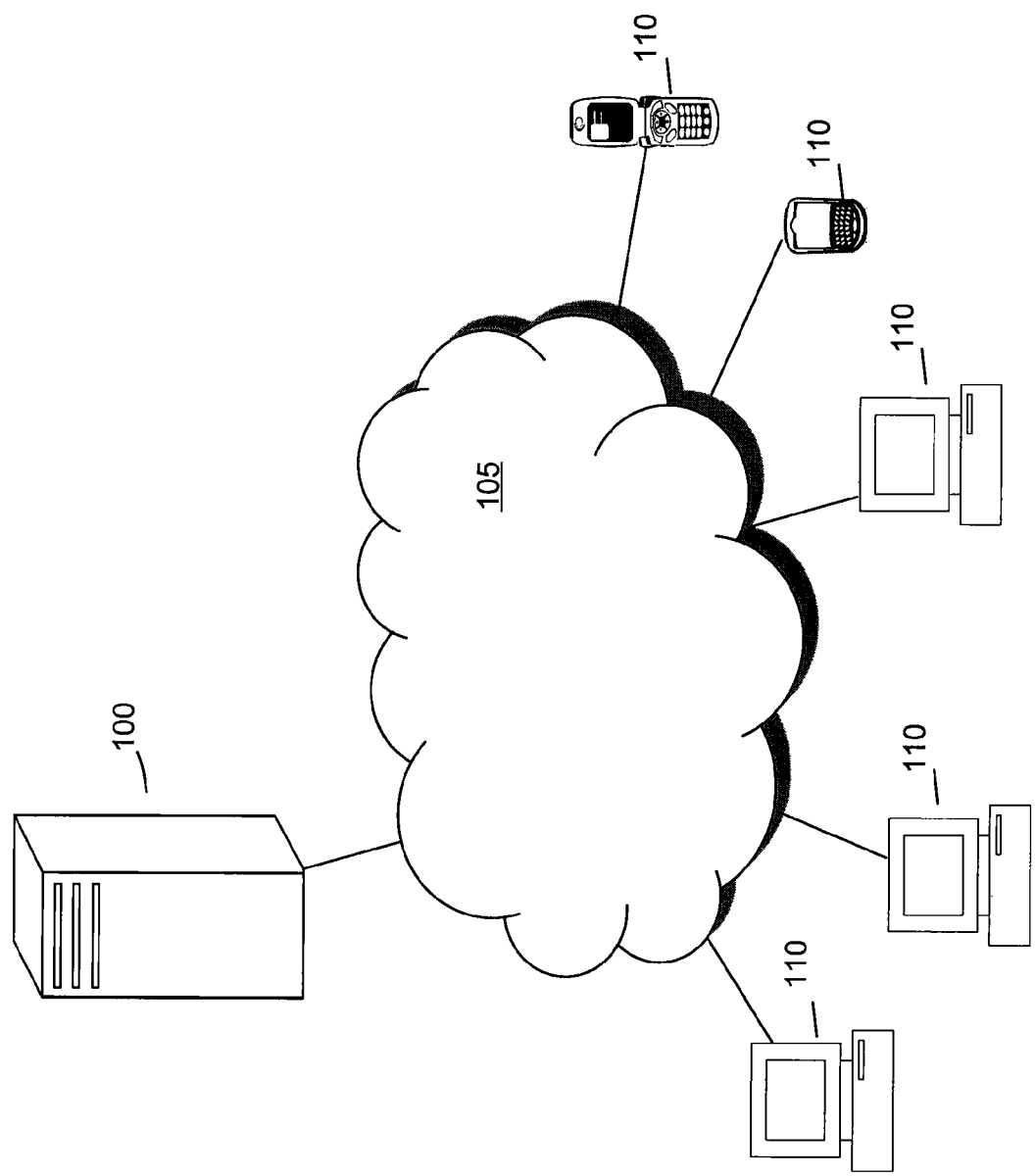
FIG. 1 illustrates an embodiment of an advertising system.

FIG. 1 illustrates an embodiment of an advertising system. An embodiment shown in FIG. 1 includes a server 100, network 105, and interactive devices 110. The server 100 may be a single computer running software or may be many computers and related devices configured to deliver advertising content to an interactive device 110. Moreover, server 100 may be any combination of dedicated software and hardware modules that together operate to deliver advertising information to an interactive device 110.

Interactive devices 110 may be any hardware device, software device, software module running on a device, or any combination thereof for viewing advertisements from server 100. Examples of interactive devices 110 include but are not limited to computers, cell phones, wireless handheld devices, monitors and televisions with set top boxes, software viewers, web browsers or any device or software that provides a way to display advertising content and provides a way to send input to an advertising system.

As illustrated in FIG. 1, embodiments of an advertising system may connect to interactive devices 110 through a network 105. Network 105 may be any type of infrastructure used to send advertising content from a server 100 to an interactive device 110. Examples of networks 105 include but are not limited to a local area network (LAN), a wide area network (WAN), and the Internet. Moreover, network 105 may be a combination of networks that provide a connection for server 100 to deliver advertising content to an interactive device 110. Examples of advertising content include video, audio, text, and other multimedia content.

Figure 2:
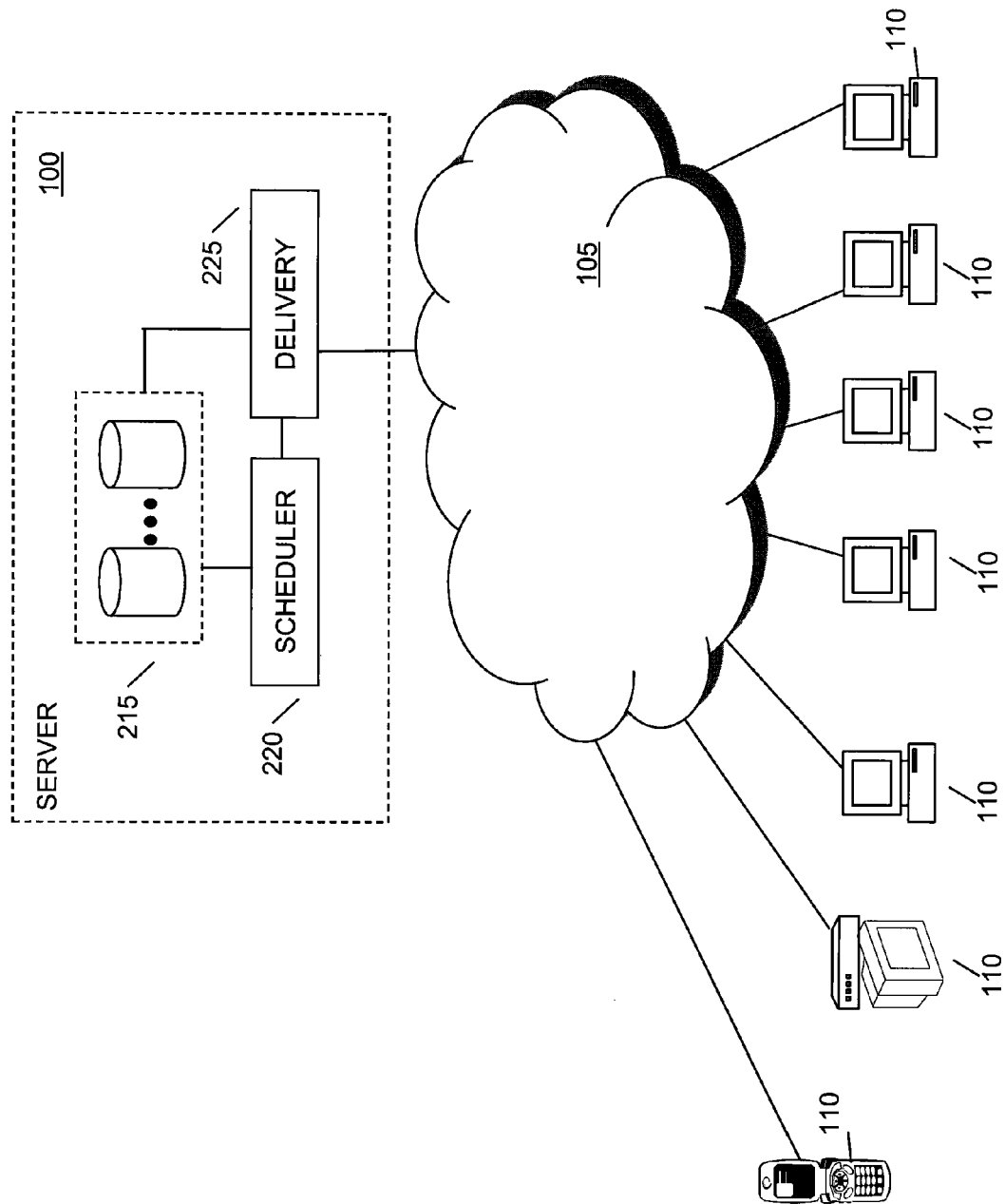
FIG. 2 illustrates a block diagram of an embodiment of an advertising server connected to interactive devices through a network.

FIG. 2 illustrates an embodiment of a server 100. Server 100 may include at least one data processor or central processing unit (CPU), a storage module 215, a scheduler module 220, and a delivery module 225. Storage module 215 may be any computer memory or storage device. Such storage devices include conventional magnetic disks, optical disks such as CD-ROM or DVD based storage, magneto-optical (MO) storage, or any other type of storage devices suitable for storing advertising content. Moreover, storage module 215 may be any combination of storage devices.

For an embodiment, scheduler module 220 is coupled with storage module 215. The scheduler module 220 creates a play list of advertising content for delivering to an interactive device 110. Factors used to create a play list include, but are not limited to, availability of advertising content, opportunity cost, demand, market forces, type of content, advertiser input, and preferences of a user. The scheduling module 220 may also create a plurality of play lists organized into channels for a user to select. Moreover, a play list may be created to individualize content for particular countries, regions, or localities.

For some embodiments, a scheduler module 220 selects a group of advertising content that has been uploaded to a storage module 215 based on a type of advertising content, country, and/or region the advertising content is to be shown. Scheduler module 220 may then arrange advertising content into a play list by assigning advertising content to time slots. The assignment of advertising content may be based on a time slot preference request by an advertiser. If the same time slot has been requested for more than one advertising content, the scheduler may use any of the factors listed above to determine which advertising content is assigned to the time slot. For an embodiment, scheduler 220 may use opportunity cost to determine which advertising content to assign to the time slot. The advertising content that was not assigned would then be assigned to an available time slot nearest to the one originally requested. Alternatively, scheduling module 220 may select a group of advertising content from storage module 215 and assign advertising content randomly to time slots in a play list.

For an embodiment, a play list dynamically created by scheduler module 220. For example, a play list may be created dynamically responsive to an input from an interactive device 110. Such an input from an interactive device 110 may include a request for a specific advertising topic, a call for action request, or a change of the country, region, or locality of an interactive device is changed. A play list may include any amount of advertising content. For an embodiment, a play list includes enough advertising content to run continuously for an entire day, week, or month. Alternatively, a play list may be created to run continuously for a certain period of a time, such as an hour or more during a day. For some embodiments, a play list is created in full before any advertising content is delivered to an interactive device 110. Other embodiments include creating a play list in sections. For example, for a play list that plays continuously for a day, the play list may be created in one hour sections.

For an embodiment, a play list may be a list of time slots that include a content identification number for the advertising content assigned to each time slot. The time slot may also include the start time and end time for the advertising content. Alternatively, a play list may include a list of location references pointing to advertising content in the order the advertising content is to be played. Location references may include any alphanumeric combination, a reference to a storage location, an Internet protocol address, a uniform resource locator (URL), or any combination thereof. For an embodiment, this play list may then be delivered to an interactive device 110. An interactive device 110 may then request advertising content from server 100 in the order set out in the play list. For an embodiment, the request for content may be a hypertext transfer protocol request (HTTP).

For some embodiments, an interactive device 110 may receive all the time slots for a play list. Alternatively, an interactive device 110 may receive a portion of time slots for a play list. For example, interactive device 110 may send server 100 the local time and a channel number. Server 110 may then send interactive device 110 a portion of a play list appropriate for the local time of the interactive device 110 for the channel number requested.

An embodiment shown in FIG. 2 also includes a delivery module 225 coupled with scheduler module 220. For some embodiments, delivery module 225 may send advertising content to an interactive device 110 based on a request received from the interactive device 110. For some embodiments, instead of receiving a request from an interactive device, as discussed above, delivery module 225 uses a play list provided by scheduler module 220 to deliver advertising content to interactive devices 110. Delivery module 225 may use streaming technology to deliver advertising content to an interactive device 110. An embodiment includes streaming advertising content using a unicast protocol, such as User Datagram Protocol (UDP), as a streaming technology to deliver advertising content in small packets to an interactive device 110. Other protocols that may be used as a streaming technology include Real-time Streaming Protocol (RTSP), Real-time Transport Protocol (RTP), Real-time Transport Control Protocol (RTCP), multicast protocols, such as IP Multicast, or peer to peer (P2P) protocols.

Alternatively, video advertising content may be delivered by delivery module 225 one video at a time to an interactive device 110 for storing in memory or a cache until the time the video advertising content is to be played. An embodiment of delivery module 225 may use media servers capable of delivering multiple formats of video advertising content interchangeably to deliver advertising content to an interactive device 110. Examples of media server formats include Adobe Flash Media Server, Wowza Media Server, Real Media Server, and Microsoft Windows Media Server.

Furthermore, an embodiment of a delivery module 225 may deliver advertising content simultaneously. For example, two or more interactive devices 110 may be connected to server 100 and view the same or different channels. Delivery module 225 can deliver the different channels to the interactive devices 110 simultaneously. Another example includes a delivery module 225 delivering advertising content simultaneously to a single interactive device 110. Such an example includes an interactive device 110 that is capable of displaying multiple forms or channels of advertising content at the same time. For example, an interactive device 110 may have multiple instances of a viewer to display advertising content. For an embodiment, one graphic user interface running on an interactive device 110 may include one or more viewers for advertising content. For such an example, interactive device 110 may request advertising content for both viewers. For an embodiment, each viewer may be assigned to a distinct port number so that an interactive device may request a play list for the first viewer on one port and a play list for the second viewer on another port. The interactive device 110 may then request advertising content for multiple viewers at a time.

An embodiment of a delivery module 225 delivers advertising content to a plurality of interactive devices 110 and/or a plurality of viewers simultaneously by multiplexing streams of advertising content together. For example, delivery module 225 may use statistical multiplexing so that streams of advertising content are delivered over a communication channel that is divided into an arbitrary number of variable bit-rate channels or data streams. Each stream may be associated to an interactive device 110 and/or a viewer using a unique identifier, such as any alphanumeric combination, a port number, an Internet protocol address, a medium access control (MAC) address, or any combination thereof.

Figure 3:
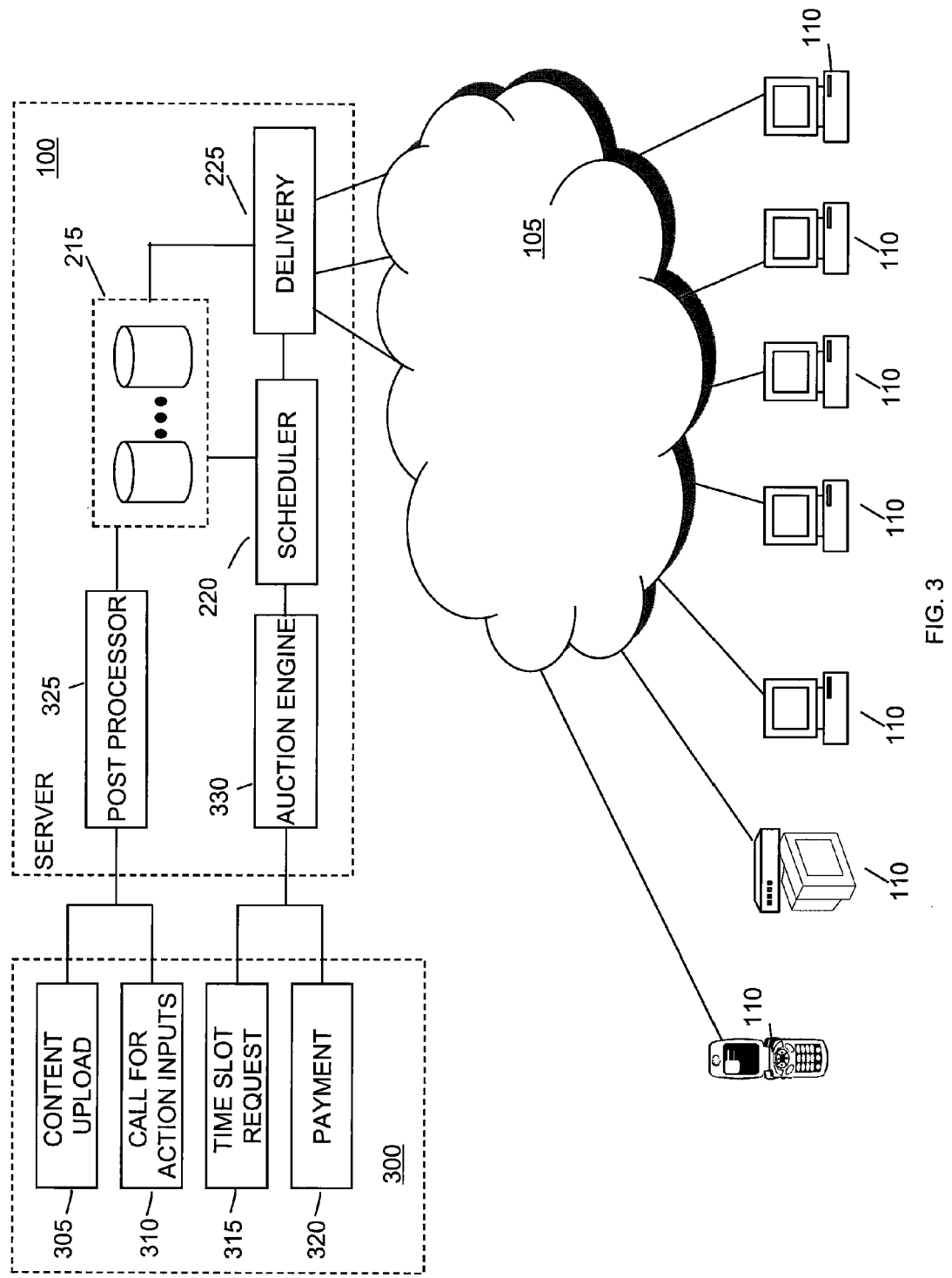
FIG. 3 illustrates an embodiment of an advertising server connected to an advertiser interface module.

FIG. 3 illustrates an embodiment of an advertising system having an advertiser interface module 300. Advertiser interface module 300 may be separate from server 100, as illustrated in FIG. 3. Alternatively, advertiser interface module 300 may be integrated into server 100. An embodiment shown in FIG. 3 includes an interface module having a content upload module 305, a call for action inputs module 310, a slot request module 315, and a payment module 325. Content upload module 305 receives advertising content from an advertiser and provides the content to server 100. For an embodiment, content upload module 305 is coupled with post processor module 325.

Post processor module 325 performs processing of advertising content uploaded to content upload module 305. For example, post processor module 325 may convert several formats of image media, video media, and audio media into a format supported by an embodiment of the advertising system. Supported formats may include Joint Picture Experts Group (JPEG) formats, Moving Picture Experts Group (MPEG) formats, Windows Media Audio (WMA), H.263, Audio Video Interleave (avi) formats, Tagged Image File Format (TIFF), Graphics Interchange Format (GIF), Flash Video formats, RealAudio formats, or any other media formats. For an embodiment, the post processor module 325 converts video formats received from content upload module 305 into a Flash Video format. The post processor module 325, for an embodiment, adds water marks to advertising content uploaded.

Post processor module 325 is also coupled with a call for action inputs module 310 of the advertising interface for the FIG. 3 embodiment. Call for action inputs module 310 provides an advertiser a way to define an interaction with a viewer that is coordinated with the advertising content. For example, a call for action may be launching a separate browser, e-mailing additional information, initiating an instant message session, transacting business on an e-commerce site, launching a phone call using the plain old telephone service (POTS) or voice over Internet protocol (VOIP) technology, providing related advertising content, providing promotional information, providing coupons including variable coupons, and providing discounts.

For some embodiments, a call for action includes a variable coupon. A variable coupon may provide varying incentives or discounts to a user or a group of users for a related advertising content. For example, a variable coupon may display a 10% discount to most users, but the twentieth user may receive a 20% discount, the fiftieth user may receive a 50% discount, and the hundredth user may receive a 75% discount. Such a variable coupon could be used to give an incentive for a user to act immediately to the advertising content because the next viewing of the advertising content might not offer the same discount.

For some embodiments, a variable coupon may be assigned to advertising content by an advertiser when advertising content is uploaded to an advertiser interface module 300. For such an embodiment, the advertiser may define when a variable coupon will display the various discounts to a user or a group of users. For other embodiments, a scheduler module 220 may determine the value of a variable coupon displayed to a user. A scheduler module 220, for some embodiments, may assign a discount value to a variable coupon based on a target profile or other heuristics. For example, a user may provide occupation, age, interests, and/or other information to match against a target profile. When information of a user matches the target profile, that user may receive a variable coupon with a different discount then a user who does not match the target profile.

Furthermore, a scheduler module 220 may use information gathered through a user's interaction with an advertising system to assign promotional material to advertising control for a specific user or assign a value to a variable coupon for a specific user. For example, an embodiment of an advertising system may track user view heuristics such as the type of advertising content a user requests, the type of advertising content a user responds to a call for action, textual tags a user selects, context tags a user selects, and/or other interactions with an advertising system. For an embodiment, a scheduler module 220 may assign a value to a variable coupon associated with advertising content for a user based on any information gathered on that user. Similarly, scheduler module 220 may associate promotional information to advertising content to be viewed by a user based on any information gathered on that user.

The post processor module 325 for an embodiment associates call for action received from the call for action inputs module 310 with the advertising content received from the content upload module 305. Once the post processor module 325 performs the processing on the advertising content and associates the call for action inputs with the advertising content, the appropriate files are transferred to storage module 215. These files are then delivered to one or more interactive devices 110. For an embodiment, scheduler module 220 associates the appropriate files with one or more play lists. The play lists are then used by delivery module 225 to determine when to deliver advertising content to an interactive device 110.

Advertising interface of a FIG. 3 embodiment also includes a slot request module 315 and a payment module 320 coupled with an auction engine 330. Slot request module 315 provides an interface to accept a request from an advertiser for a time slot for playing the submitted advertising content. Embodiments of the advertising system provide for an advertiser to select from a range of time that the advertisement may be played such as within a day or a period of a day. Alternatively, an embodiment may provide for the advertiser to request a specific time for the advertisement to be played.

The advertising module 300 also includes a payment module 320. For an embodiment, the payment module calculates fees and provides a way for an advertiser to pay for fees associated with uploading advertising content. For an embodiment, payment module 320 accepts credit card information and processes the credit card information. In addition, some embodiments include a payment module 320 that maintains an account of transactions to be billed to an advertiser periodically. Other payment methods used by payment module 320 may include electronic check, a prepaid account that is debited for transactions, or interfacing with a third party that provides accounting and billing services.

The auction engine module 330 provides a way for an advertiser to bid for a time slot for an advertisement to play on an embodiment of the advertising system. To accomplish the bidding functionality, auction engine module 330 receives the time slot request information from the slot request module 315 and payment information from payment module 320. This information is used to evaluate bids to determine which advertiser gets a particular time slot. For an embodiment, advertisers bidding on time slots would be asked for one or more alternate time slots. Therefore, if the advertiser's bid is rejected, an alternate time slot may be allocated. The auction engine module 330 then provides the information of which advertiser has successfully bid for a given time slot to scheduler module 220. The scheduler module 220 then uses this information to create a play list.

Figure 4:
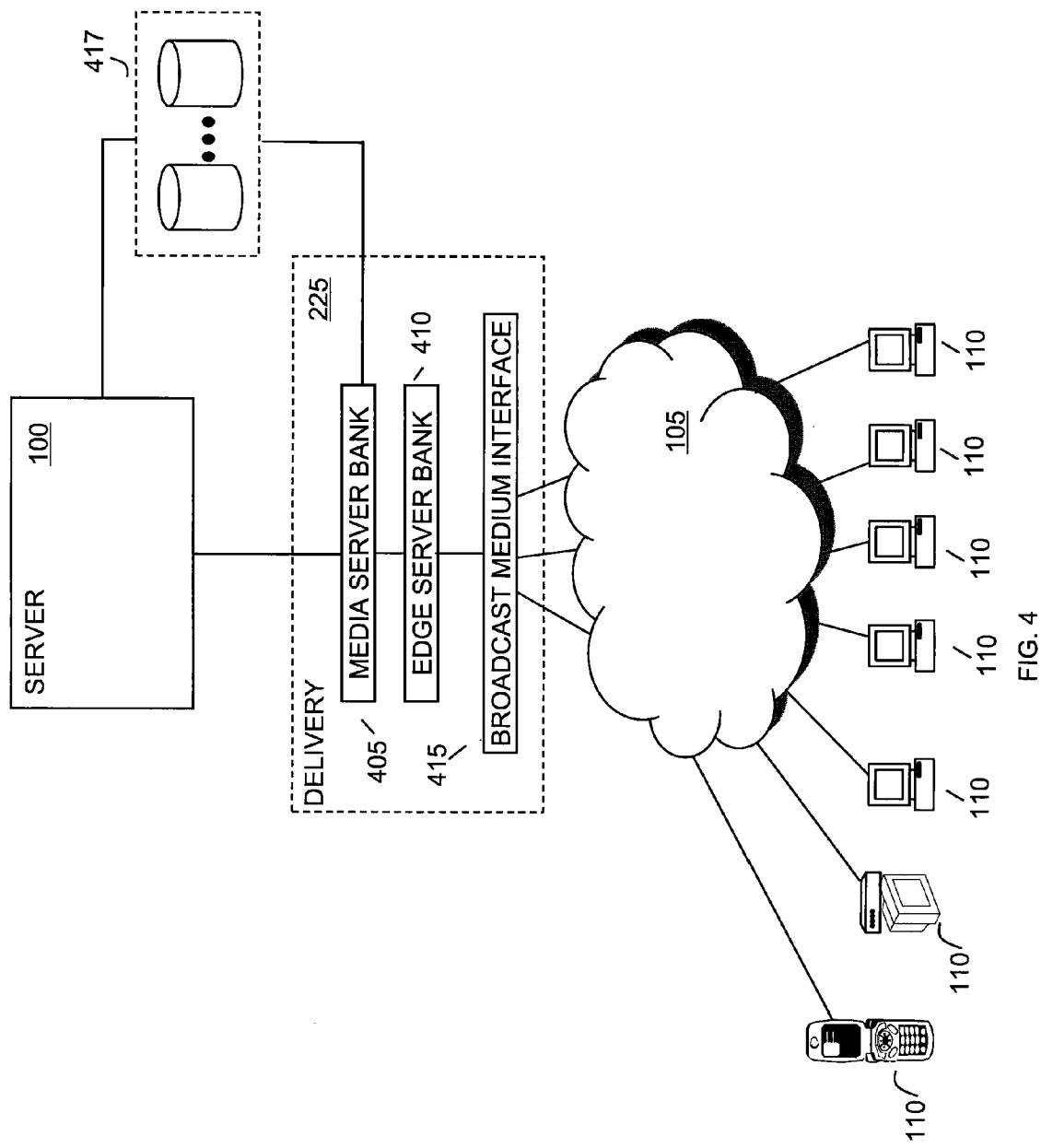
FIG. 4 illustrates an embodiment of an advertising system including a delivery module.

FIG. 4 illustrates an embodiment of the advertising system having a delivery module 225 coupled with server 100. An embodiment of the delivery module 225 includes a media server bank 405, an edge server bank 410, and a broadcast medium interface 415. Media server bank 405 may include any number of different formats of media servers. As discussed above, media servers may include Adobe Flash Media Server, Wowza Media Server, Microsoft Windows Media Server, and any other type of media server. The advertising content may then be delivered to an interactive device 110 through network 105 using any type of broadcast medium. Delivery module 225 includes a broadcast medium interface 415 to interface with network 105. Examples of such broadcast medium interfaces include asynchronous transfer mode (ATM), Ethernet, cable, wireless, and optical. An embodiment of the advertising system may include more than one type of a broadcast medium interface 415.

For an embodiment, the edge server bank 410 may contain a plurality of servers that interface with a broadcast medium interface 415 and a media server bank 405. Embodiments of an edge server bank 410 act as a proxy between media server bank 405 and one or more interactive devices 110. Edge server bank 410 may receive a request from an interactive device 110 and forward such a request to an appropriate media server bank 405 or server 100. Moreover, edge server bank 410 may convert requests into a proper format for media server bank 405 and/or server 100 to reduce processor demands of media server bank 405 and/or server 100. Similarly, edge server bank 410 may convert transmissions from media server bank 405 and/or server 100 into a proper format for sending through broadcast medium interface 415 to an interactive device 110. An embodiment of edge server bank 410 may also perform encryption and/or authentication of information sent to and from interactive device 110.

An embodiment shown in FIG. 4 also includes an auxiliary storage module 417 for storing advertising content. The auxiliary storage module 417 may be any storage device. Such storage devices include conventional magnetic disks, optical disks such as CD-ROM or DVD based storage, magneto-optical (MO) storage, random access memory (RAM), flash memory, or any other type of storage devices suitable for storing advertising content. Moreover, storage module 215 may be any combination of storage devices. An embodiment shown in FIG. 4 includes an auxiliary storage module 417 external to server 100. Auxiliary storage module 417 may be at the same physical location as server 100 or may be located at a separate location. An embodiment having an auxiliary storage module 417 located at a separate location includes an auxiliary storage module 417 coupled with server 100 through a network. Moreover, another embodiment of an advertising system includes an auxiliary storage module 417 that is internal to server 100.

For an embodiment, auxiliary storage module 417 is coupled with storage module 215, scheduler module 220, and media server bank 405. Auxiliary storage module 417, similar to storage module 215, may be used to store any advertising content. Scheduler module 220 may use the advertising content in both auxiliary storage module 417 and storage module 215 to build play lists. One or several play lists may be delivered to media server bank 405. Media server bank 405, for an embodiment, accesses advertising content from storage module 215 and/or auxiliary storage module 417 to deliver advertising content according to play lists created by scheduler module 220. An alternative embodiment includes a scheduler module 220 that creates play lists and delivers or has delivered advertising content from storage module 215 and/or auxiliary storage module 417 to delivery module 225.

Figure 5:
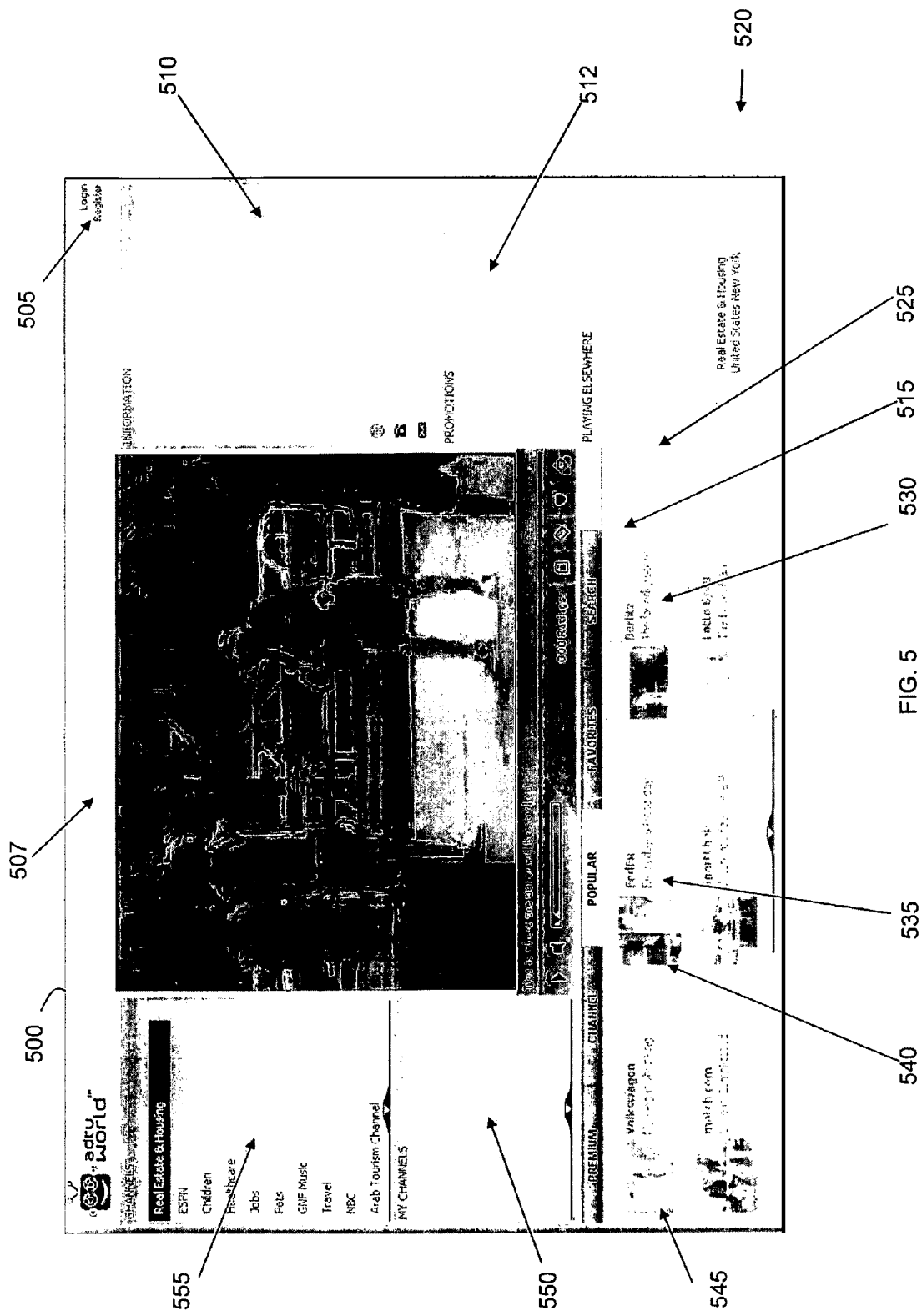
FIG. 5 illustrates a graphic user interface according to an embodiment of an advertising system.

FIG. 5 illustrates a graphic user interface (GUI) 500 that is used to view advertising content on an interactive device 110 according to an embodiment of an advertising system. The GUI 500 of FIG. 5 includes a sign in/register area 505 including a link to provide a way for a user to log onto an embodiment of an advertising system or register with the advertising system. The sign in and registration process provides a way for an embodiment of an advertising system to obtain and maintain preferences of a user. The preferences may be used by the scheduler module 220 to create a channel for a user based on these preferences. Preferences may be stored by server 100 or stored on an interactive device 110, for example using a cookie.

GUI 500 may also include a country/region/locality area that allows a user to select an appropriate country/region/locality in which the user is located or interested. Selecting the country/region/locality will allow an embodiment of the advertising system to provide advertising content relevant to that country/region/locality. Viewing area 507 provides an area to display advertising content. For an embodiment, viewing area 507 displays advertising content determined by a play list. An embodiment includes a viewing area 507 that includes a video player to play video advertising content.

GUI 500, as illustrated in FIG. 5, also includes a call for action area 510. The call for action area 510 provides a way for an advertiser to allow a user to interact with an advertisement, as discussed above. Thus, a call for action area 510 may include a link to perform an action such as launching a separate browser, transacting business on an e-commerce site, launching a phone call, launching an instant message session, providing coupons, and providing discounts. For some embodiments a coupon or promotional information is displayed in a promotions area 512 as shown in one embodiment illustrated in FIG. 5. Other embodiments include displaying coupons and promotional information in a call for action area 510.

An embodiment shown in FIG. 5 also includes a ratings area 515. Ratings area 515 provides a way for a user to give feedback to advertisers about the advertisements. Such feedback to an advertiser provides information as to the effectiveness of the advertising content. Another area on GUI 500 is a random channel area 520. The random channel area 520 provides an area to display secondary advertising content. For an embodiment, random channel area 520 displays advertising not associated with viewing area 507 but is selected based on a user's preferences.

An embodiment may include a GUI 500 that includes a search area 525. Search area 525 provides a user a way to search advertising content. For example, an embodiment provides searching to locate advertising content based on textual tags. Such textual tags include, but are not limited to, name of a video, description, brand, model, company, country, region, locality, or address. GUI 500 may also include a favorite advertisement area 530 for displaying links to advertising content that users assigned high ratings. Another area includes a popular advertisement area 535 to display links to advertising content that are the most viewed. To play a video on demand, a user may select a link to any video on the GUI 500. Furthermore, an embodiment includes a channel advertisement area 540 that displays up and coming advertising content for a channel currently viewed by a user.

The GUI 500 of the FIG. 5 embodiments also includes a premium content area 545. The premium content area 545 provides an area to display links to featured advertising content. For an embodiment, advertisers may pay a fee to have advertising content displayed in the premium advertisement area 545. Another area included in the FIG. 5 embodiments is a favorite channel area 550. This area displays links to channels of advertising content that a user views the most. The GUI 500 for an embodiment also includes a channel area 555. The channel area 555 lists channels accessible to a user. Examples of channels include but are not limited to channels for jobs, personals, classifieds, technology, real estate, restaurants, vacations, and infomercials.

Figure 6:
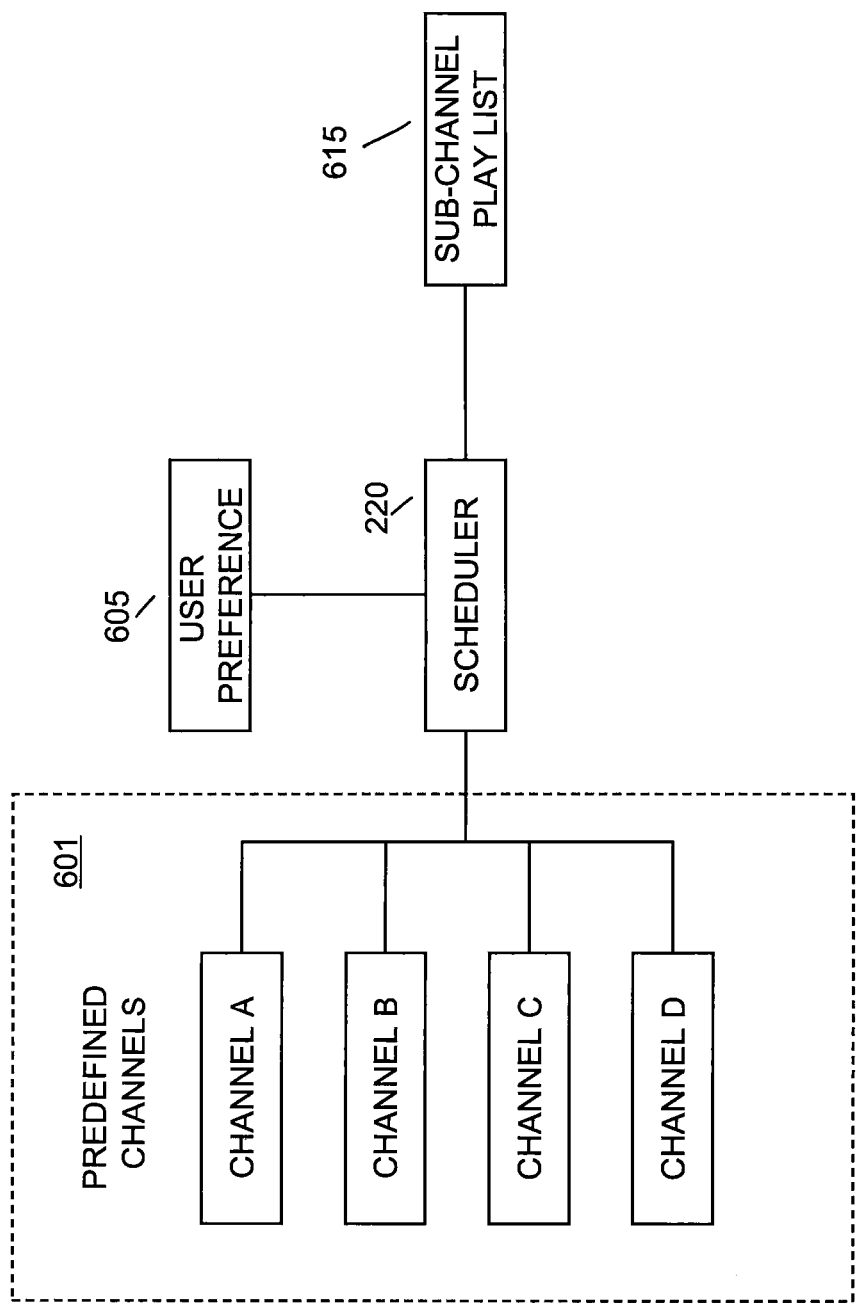
FIG. 6 illustrates a diagram of the creation of a sub-channel according to an embodiment of an advertising system.

For an embodiment, a user may create a sub-channel based on the user's interests. A sub-channel may be made from advertising content drawn from a mix of user selected channels. FIG. 6 illustrates a diagram of the creation of a sub-channel for an embodiment of the advertising system. For an embodiment, predefined channels 601 or a subset of one channel are used as a source to pull advertising content from to create a sub-channel. The content of the predefined channels 601 is used by a scheduler module 220 to select advertising content to create a sub-channel based on user preferences 605. The output of scheduler module 220 is a sub-channel play list 615. This play list is used to deliver advertising content to the user's interactive device 110, as discussed above. An embodiment of the advertising system also uses the above process to create a random channel to display in a random channel area 520 of a GUI 500 on an interactive device 110.

Figure 7:
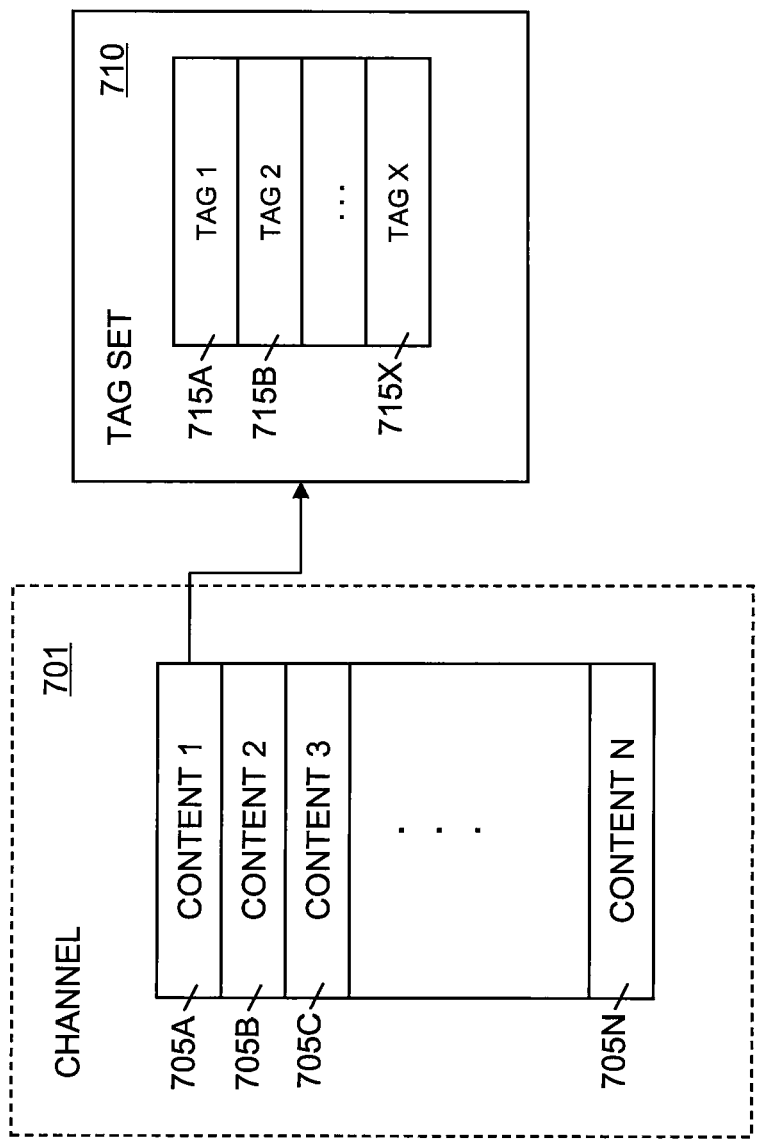
FIG. 7 illustrates a diagram of an association of a tag set to channel content according to an embodiment of an advertising system.

As discussed above, textual tags may be used by a user to search for advertising content. FIG. 7 illustrates a diagram representing the association of a textual tag set to advertising content. For example, channel 701 includes advertising content 705A-N. As illustrated in FIG. 7, advertising content 705A is associated with textual tag set 710A. Textual tag set 710A includes a set of textual tags 715A-X. Similarly, any advertising content of a channel 701 may be associated with a textual tag set. For an embodiment, creation of textual tags 715A-X is done by an advertiser that uploads advertising content. Alternatively, textual tags may be added over time, for example by a system administrator or user, as each advertisement is reviewed.

Another embodiment includes using automatic recognition to add textual tags to advertising content. For an embodiment, algorithms may be used to recognize patterns or shapes within advertising content and associate textual tags to the advertising content based on these certain patterns or shapes. For example, an algorithm or set of algorithms may recognize the pattern or shape of a house or building in advertising content and associate textual tags for vacation rentals, time share properties, luxury homes, paint, wood working tools, hardware supplies, dating, party supplies, or other relevant topics with the house or building. Similarly, an algorithm or set of algorithms may recognize water and associate textual tags for beach resorts, vacation homes, vacations, cruises, jet skiing, snorkeling, sun tan lotion, tropical drinks or other relevant topics to the region containing water in the advertisement.

Figure 8:
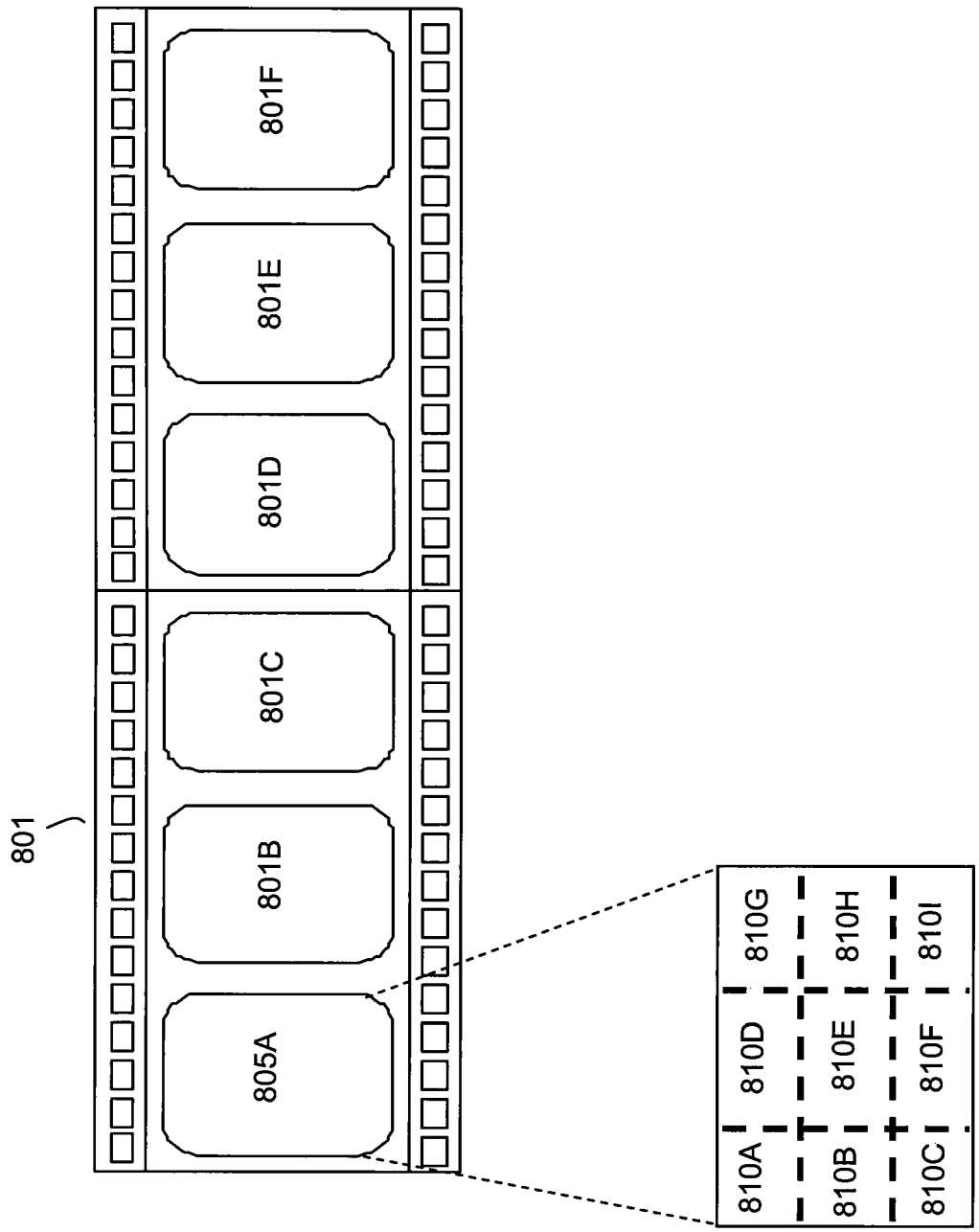
FIG. 8 illustrates a video frame divided into context regions according to an embodiment of an advertising system.
Figure 9:
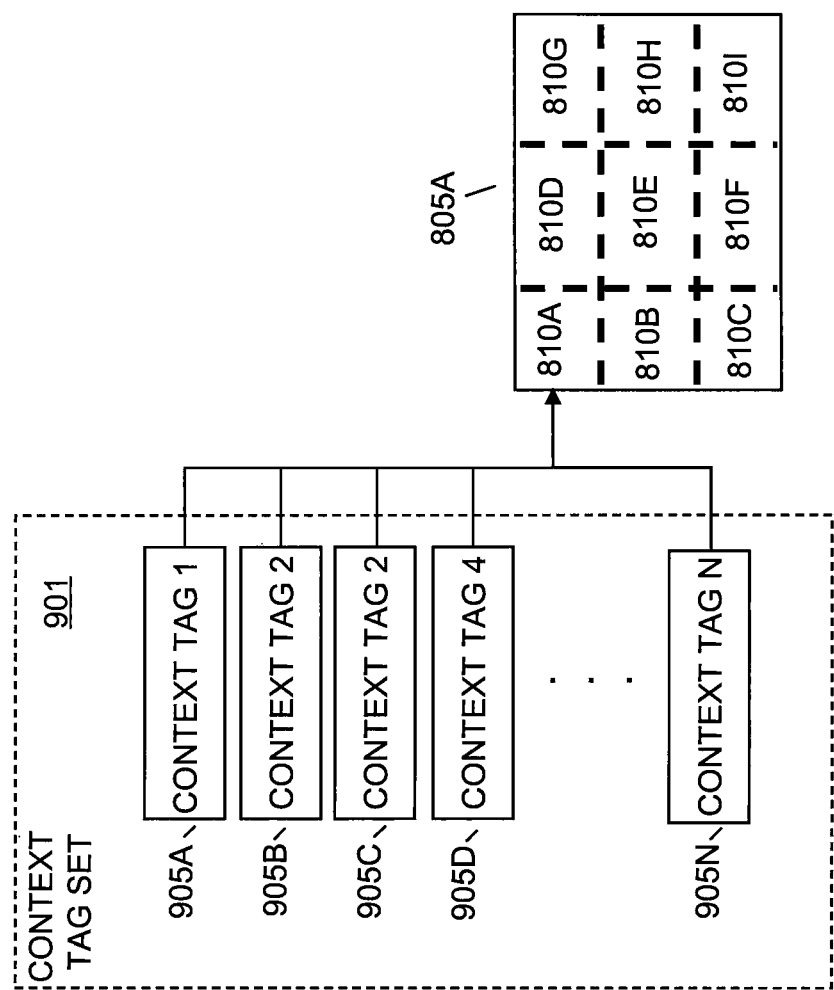
FIG. 9 illustrates a diagram of a an association of a set of context tags to a context region of a video frame according to an embodiment of an advertising system.

FIG. 8 illustrates a video clip 801 having a plurality of video frames 805A-F. For an embodiment of the advertising system, video frames 805A-F of advertising content can be associated with context tags. For example, FIG. 8 illustrates a plurality of video frames 805A-F, where video frame 805A is divided into a plurality of context regions 810A-I. Each context region 805A-I may be associated with one or more context tags. Associating context tags with video frames 805A-F, instead of a video clip as a whole, creates the ability to change context tags dynamically as a video clip is viewed. Context tags may be associated with context regions manually by an advertiser or a system administrator or automatically by using automatic recognition, similar to that discussed above. FIG. 9 illustrates a diagram of a context tag set 901 including context tags 905A-N is associated with a context region 810A of video frame 805A.

For an embodiment, a user can interact with video advertising content having context tags, such as video advertising content displayed in viewing area 507 of a GUI 500. The user may interact with video advertising content by placing a cursor or pointer on a section of the video advertising content. Once the cursor is present in a section of the video advertising content for a predetermined amount of time for an embodiment, the context tags associated with that section of the video advertising content appear and the user can choose any one of the context tags associated with that region of the video advertising content.

For an embodiment, the window may be a pop-up window containing a list of context tags that are selectable. For another embodiment the context tags may appear in a region of GUI 500 for a user to select. For some embodiments the context tags appear in a window or region after the cursor has been in a section of the video advertising content for one second or greater. Other embodiments display a list of context tags when a cursor has been in a region of the video advertising content less than one second. When the user selects a context tag, a subset of video advertisement content that have similar context tags are retrieved and shown as a separate sub-channel. The sub-channel would be created by a scheduler module 220, as discussed above, for video advertising content associated with the selected context tag. Alternatively, selecting a context tag may initiate a call for action.

For an embodiment, a set of context tags shown to a user may be adaptive based on a user's preferences or usage of the advertising system. For example, context tags may be selected for a user based on the advertisement viewing history of a user. One such embodiment includes maintaining a record of the channels viewed by a user, the call for actions selected by a user, and/or previous context tags selected. Thus, the advertising system may use this user specific information to assign context tags to sections of video advertising content that will be viewed by that user. For an embodiment, the viewing history of a user is stored on a user's viewing device. Alternatively, the viewing history of a user is stored in a storage module of an embodiment of the advertising system. An embodiment includes having contextual tagging and display of the context tags in video advertising content as a user preference that is opted-in by a user.

An embodiment of an advertising system uses Flash Video formats to attach context tags to video frames using cue points embedded in the video frames. Thus, a Flash Video player may be used in GUI 500 in the viewer area 507 so that the cue point data embedded in the video frame will retrieve any context tags associated with a region of a video frame that is selected by a user. An embodiment including context tags may alter captions, search keywords, call for actions, or other aspects of GUI 500 responsive to a context tag being selected.

Figure 10:
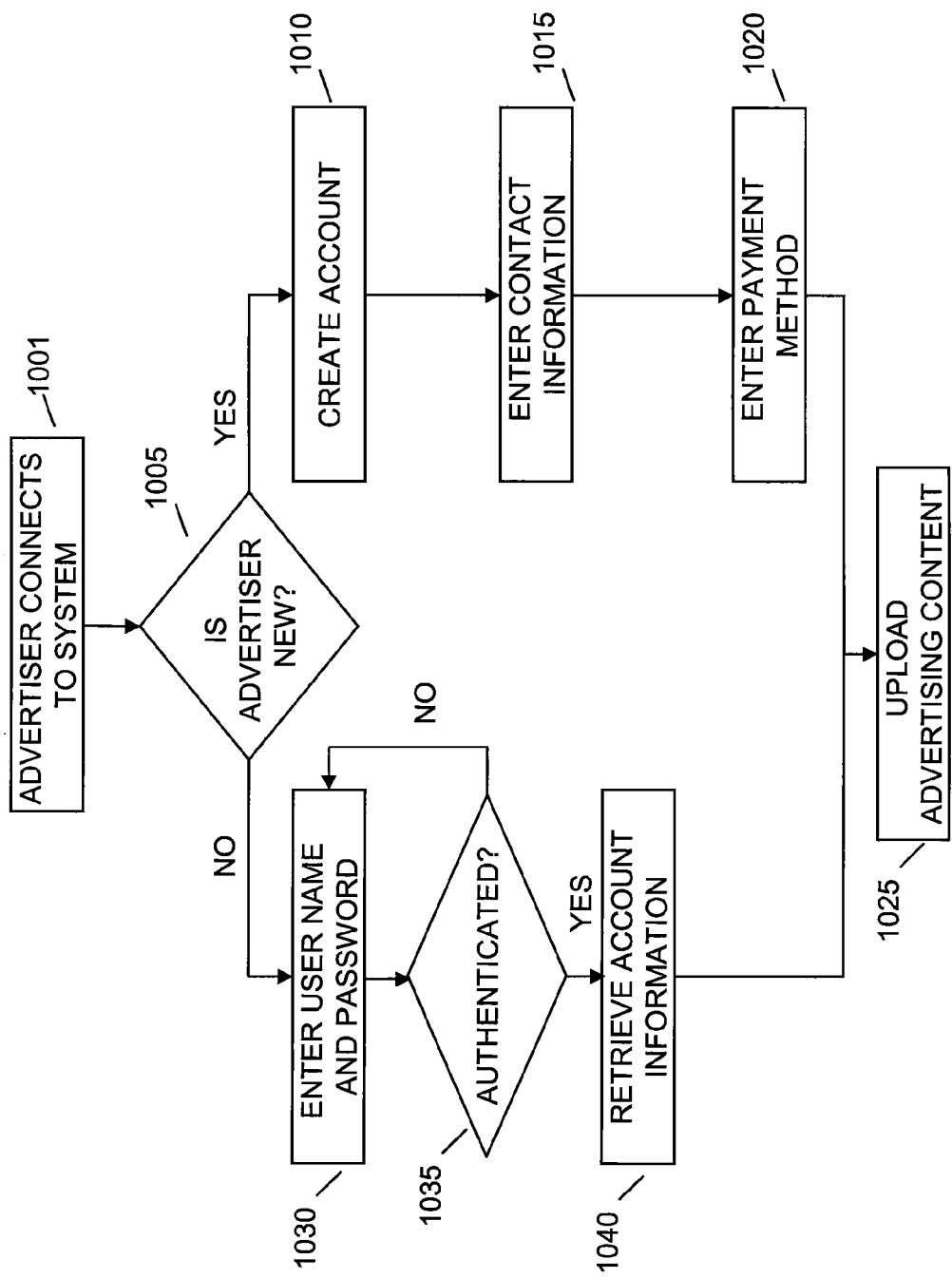
FIG. 10 illustrates a flow diagram of a process for an advertiser to upload advertising content for viewing according to an embodiment of an advertising system.

FIG. 10 illustrates a diagram of a login process for an advertiser according to an embodiment of the advertising system. At block 1001, advertiser connects to the advertising system. At block 1005, advertising system determines if advertiser is a new advertiser, for example, by the advertiser selecting a link to register as a new user. If advertiser is a new advertiser, the advertiser creates an account as represented by block 1010. Next, the advertiser enters contact information at block 1015 and payment method at block 1020. Then at block 1025, advertiser may upload any advertising content.

If at block 1005, the advertiser is not a new advertiser, the advertiser logs in to the advertising system by entering a user name and a password as represented by block 1030. If at block 1035 the advertising system fails to authenticate the advertiser, the flow moves back to 1030 to request a user name and a password. Once an advertiser's user name and password are authenticated, the flow moves to block 1040 where the advertiser's account information is retrieved. Then the flow moves to block 1025, where an advertiser may now upload advertising content to the advertising system.

Figure 11:
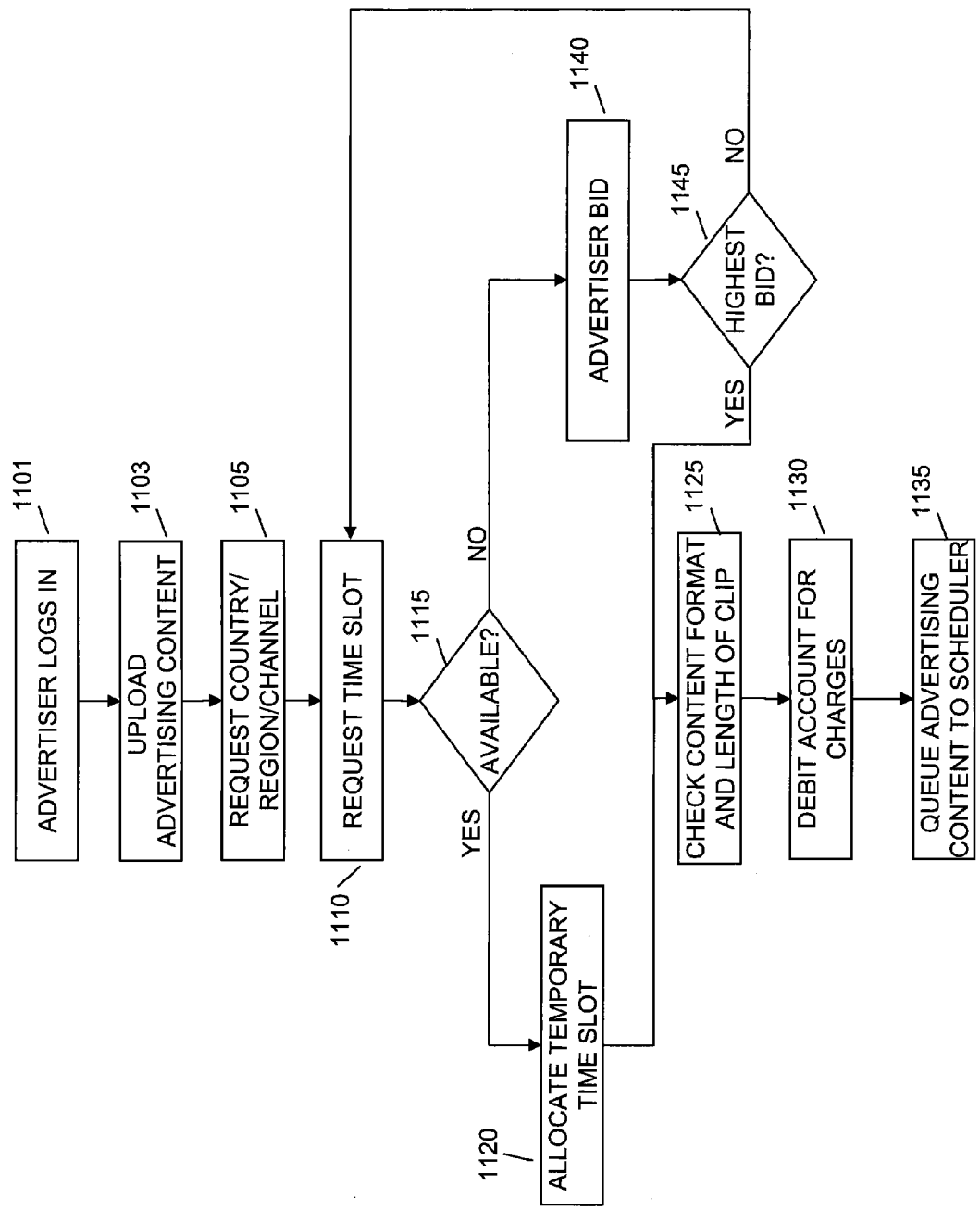
FIG. 11 illustrates a flow diagram of a process for allocating a time slot according to an embodiment of an advertising system.

FIG. 11 illustrates a diagram of a process for an advertiser to upload advertising content. At block 1101, an advertiser logs in to an embodiment of the advertising system and uploads advertising content at block 1103. The advertiser may then request that the uploaded advertising content be included in the advertising content for a selected country, region, locality, and/or channel at block 1105. An advertiser may also request a time slot for the advertising content to be played at block 1110 and the process moves to block 1115. If the time slot is available, the process moves to block 1120 and a temporary time slot is allocated for the advertising content. At block 1125, the advertising content is checked for proper format. Then at block 1130, the debit account for the advertiser is debited for any fees. For an embodiment the fees may be debited at the time a temporary time slot is allocated or may be debited each time the uploaded advertising content is played by an advertising system. The advertising content is then sent for scheduling by the advertisement system at block 1135.

If the requested time slot is not available at block 1115, then the process moves to block 1140. At block 1140, an advertiser may bid for a requested time slot entered at block 1110. Once the time for bidding has ended, the process moves to block 1145 where an embodiment of the advertising system will determine if the advertiser is the highest bidder. If the advertiser is the highest bidder, the process moves to block 1125 and continues as described above. Alternatively, if the advertiser is not the highest bidder, the process moves back to block 1110 to request another time slot for the uploaded advertisement.

For an embodiment, whether a time slot is allotted to an advertiser may also depend on loyalty points. Loyalty points may be assigned to an advertiser to reward an advertiser for continuing to advertise on an embodiment of the advertising system. For example, loyalty points may be awarded based on the amount of fees collected from an advertiser or based on the number of advertisements uploaded to an embodiment of an advertising system.

Figure 12:
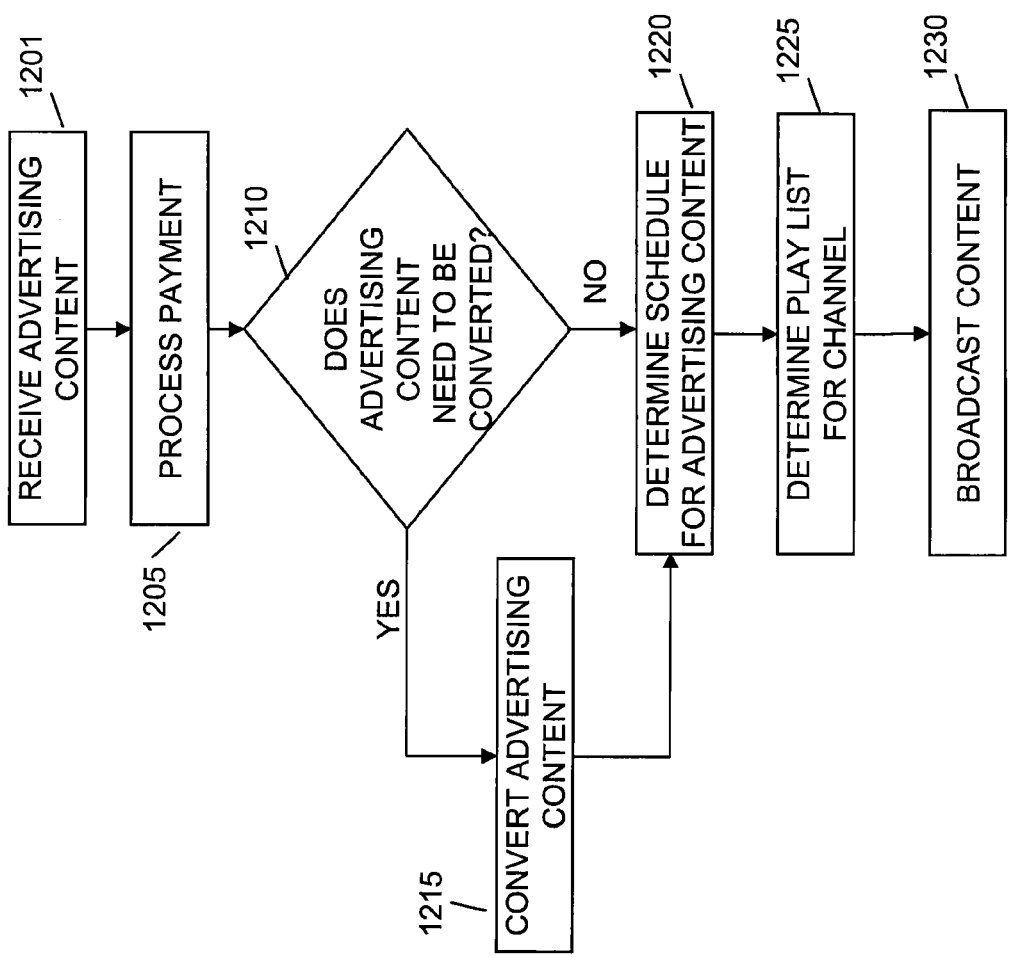
FIG. 12 illustrates a flow diagram of a process for an advertising system according to an embodiment of an advertising system.

FIG. 12 illustrates a diagram of a process for an advertising system without a bidding process according to an embodiment of the advertising system. The advertising system at block 1201 receives advertising content uploaded by an advertiser. The payment for including the advertising content for display on a viewer of the advertising system is processed at block 1205. At block 1210, advertising system determines if the advertising content needs to be converted to a format used by the advertising system. If the advertising content needs to be converted, the process moves to block 1215 where the advertising content is converted into a format used by the advertising system. For an embodiment, a software program or module may be used to convert an image, video, and/or audio format of the uploaded advertising content into an image, video, and/or audio format used by an advertising system. For example, a video advertising content uploaded to an advertising system in an MPEG format may be converted to a flash video format for use an embodiment of the advertising system.

Once converted, the process moves to block 1220 where the advertising system determines a schedule for the advertising content. At block 1225, a play list is created for a channel including the advertising content and the advertising content is broadcast to interactive devices 110 at block 1230. If at block 1210, the adverting content does not need to be converted the process moves to block 1220 and proceeds as described above.

Figure 13:
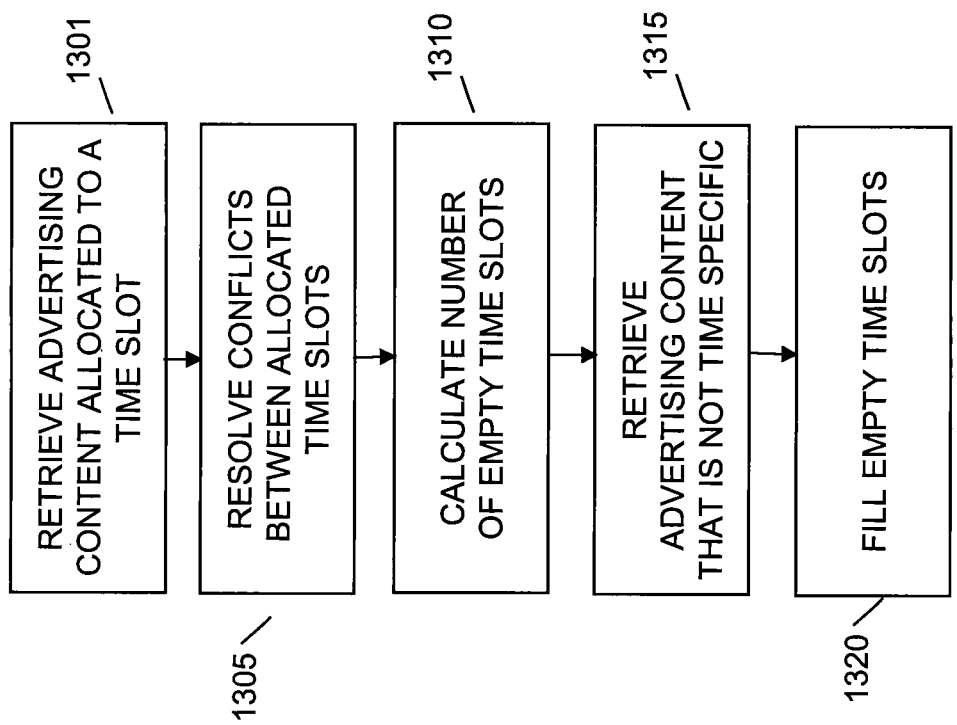
FIG. 13 illustrates a flow diagram of a process scheduling time slots according to an embodiment of an advertising system.

FIG. 13 illustrates a process for scheduling advertising content according to an embodiment of the advertising system. At block 1301, advertising content allocated to a temporary time slot is retrieved. Next, any conflicts between allocated time slots are resolved at block 1305. For an embodiment, conflicts may be resolved based on loyalty points of an advertiser. Alternatively, the conflict may be resolved by assigning time slots in the order the advertising content was uploaded to an embodiment of the advertising system. At block 1310, the advertising system calculates the number of empty time slots and at block 1315 retrieves a list of advertising content that is not time specific to fill empty slots. The empty slots are then filled with the advertising content that is not time specific at block 1320. An example of advertising content that is not time specific is advertising content that is designated to play any time during the day. For an embodiment of the advertising system, scheduling of advertising content occurs a day before the advertising content is to be delivered.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A computer-implemented method comprising:
on a server system including one or more processors and memory for storing one or more programs to be executed by the one or more processors:
receiving video advertising content;
receiving a request to schedule delivery of said video advertising content;
determining a schedule to deliver said video advertising content, including retrieving said video advertising content allocated to one of a plurality of time slots, resolving conflicts between said video advertising content allocated to a same one of said plurality of time slots, calculating the number of empty time slots, and filling said empty time slots with video advertising content not allocated to one of said plurality of time slots;
delivering said video advertising content according to said schedule;
assigning a first discount value to a first instance of a variable coupon and a second discount value to a second instance of the variable coupon, the second discount value being different from the first discount value, wherein:
the variable coupon is related to the subject matter of said video advertising content; and
the first and second discount values are based at least partially on user view heuristics of a first user and a second user, respectively, wherein user view heuristics include information selected from the group consisting of:

a type of advertising content previously requested by a respective user; and
a type of advertising content previously responded to by a respective user;
delivering the first instance of said variable coupon to a first client for display to the first user; and
delivering the second instance of said variable coupon to a second client for display to the second user.

2. The method of claim 1 further comprising delivering said video advertising content as part of a play list to an interactive device and adapting said play list responsive to an input from said interactive device.

3. The method of claim 1 wherein determining a schedule to deliver video advertising content includes assigning a time slot responsive to a bid placed for said time slot.

4. The method of claim 2 wherein said play list is adapted responsive to the selection of a context tag.

5. The method of claim 1, wherein the value of said variable coupon is determined in response to detecting a similarity between a user's profile and a target profile.

6. A server computer system including one or more processors, memory, and one or more programs stored in the memory and configured to be executed by the one or more processors, the one or more programs comprising instructions for:
receiving video advertising content;
receiving a request to schedule delivery of said video advertising content;
determining a schedule to deliver said video advertising content, including retrieving said video advertising content allocated to one of a plurality of time slots, resolving conflicts between said video advertising content allocated to a same one of said plurality of time slots, calculating the number of empty time slots, and filling said empty time slots with video advertising content not allocated to one of said plurality of time slots;
delivering said video advertising content according to said schedule;
assigning a first discount value to a first instance of a variable coupon and a second discount value to a second instance of the variable coupon, the second discount value being different from the first discount value, wherein:
the variable coupon is related to the subject matter of said video advertising content; and
the first and second discount values are based at least partially on user view heuristics of a first user and a second user, respectively, wherein user view heuristics include information selected from the group consisting of:
a type of advertising content previously requested by a respective user; and
a type of advertising content previously responded to by a respective user;
delivering the first instance of said variable coupon to a first client for display to the first user; and
delivering the second instance of said variable coupon to a second client for display to the second user.

7. The server computer of claim 6, further comprising instructions for delivering said video advertising content as part of a play list to an interactive device and adapting said play list responsive to an input from said interactive device.

8. The server computer of claim 6, wherein determining a schedule to deliver video advertising content includes assigning a time slot responsive to a bid placed for said time slot.

9. The server computer of claim 7, wherein said play list is adapted responsive to the selection of a context tag.

10. The server computer of claim 6, wherein the value of said variable coupon is determined in response to detecting a similarity between a user's profile and a target profile.

11. A non-transitory computer-readable storage medium storing one or more programs configured for execution by a server system, the one or more programs comprising instructions for:
receiving video advertising content;
receiving a request to schedule delivery of said video advertising content;
determining a schedule to deliver said video advertising content, including retrieving said video advertising content allocated to one of a plurality of time slots, resolving conflicts between said video advertising content allocated to a same one of said plurality of time slots, calculating the number of empty time slots, and filling said empty time slots with video advertising content not allocated to one of said plurality of time slots;
delivering said video advertising content according to said schedule;
assigning a first discount value to a first instance of a variable coupon and a second discount value to a second instance of the variable coupon, the second discount value being different from the first discount value, wherein:
the variable coupon is related to the subject matter of said video advertising content; and
the first and second values are based at least partially on user view heuristics of a first user and a second user, respectively, wherein user view heuristics include information selected from the group consisting of:
a type of advertising content previously requested by a respective user; and
a type of advertising content previously responded to by a respective user;
delivering the first instance of said variable coupon to a first client for display to the first user; and
delivering the second instance of said variable coupon to a second client for display to the second user.

12. The computer readable storage medium of claim 11, further comprising instructions for delivering said video advertising content as part of a play list to an interactive device and adapting said play list responsive to an input from said interactive device.

13. The computer readable storage medium of claim 11, wherein determining a schedule to deliver video advertising content includes assigning a time slot responsive to a bid placed for said time slot.

14. The computer readable storage medium of claim 12, wherein said play list is adapted responsive to the selection of a context tag.

15. The computer readable storage medium of claim 11, wherein the value of said variable coupon is determined in response to detecting a similarity between a user's profile and a target profile.

\* \* \* \* \*